(12) United States Patent
Kim

(10) Patent No.: US 7,133,090 B2
(45) Date of Patent: Nov. 7, 2006

(54) LIQUID CRYSTAL DISPLAY MODULE ASSEMBLY

(75) Inventor: Chang-Il Kim, Gyeongsangnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 107 days.

(21) Appl. No.: 10/878,348

(22) Filed: Jun. 29, 2004

(65) Prior Publication Data
US 2005/0068469 A1 Mar. 31, 2005

(30) Foreign Application Priority Data
Sep. 30, 2003 (KR) .................. 10-2003-0067859

(51) Int. Cl.
*G02F 1/1333* (2006.01)

(52) U.S. Cl. ..................................... 349/58
(58) Field of Classification Search ............ 349/58–60
See application file for complete search history.

(56) References Cited

U.S. PATENT DOCUMENTS 6,426,784 B1 * 7/2002 Sakai et al. .................. 349/58

* cited by examiner

*Primary Examiner*—Dung T. Nguyen
(74) *Attorney, Agent, or Firm*—Morgan, Lewis & Bockius LLP

(57) ABSTRACT

A liquid crystal display module includes a liquid crystal panel, a backlight assembly disposed under the liquid crystal module, a main support that supports the liquid crystal panel and the backlight assembly, and a top case divided into a plurality of top case parts at corners thereof. Each of the top case parts is coupled to the main support to fasten the liquid crystal panel and the backlight assembly.

20 Claims, 4 Drawing Sheets

LIQUID CRYSTAL DISPLAY MODULE ASSEMBLY

The present invention claims the benefit of Korean Patent Application No. 2003-0067859 filed on Sep. 30, 2003, which is hereby incorporated by reference.

BACKGROUND OF THE INVENTION

1. Field of the Invention

The present invention relates to liquid crystal display devices, more particularly, to a liquid crystal display device with a module assembly.

2. Description of the Related Art

There are many types of flat panel display devices available, including plasma display panels (PDP), field emission displays (FED), and the widely used liquid crystal display (LCD). FIG. 1 is an exploded perspective view of a mounting structure of a liquid crystal display module according to related art. The liquid crystal display module 100 has a liquid crystal (LC) panel 110 and a polarizing sheet 108 disposed over the liquid crystal panel 110. The liquid crystal display module 100 further includes a backlight assembly. The backlight assembly comprises multiple prism sheets 116 and 117 and a diffusion sheet 118. Additionally, the liquid crystal display module 110 includes a main support 130 where the liquid crystal panel 110 and the backlight assembly are installed. The liquid crystal module 110 also includes a top case 140 that fastens the liquid crystal panel 110 to the main support 130 and protects the liquid crystal panel 110 from external impact.

Although not shown in FIG. 1, a lamp housing including one or more lamps is generally installed in the main support 130. One lamp is connected to an inverter (not shown) and emits light toward the liquid crystal panel 110. A light guide plate 120 is disposed under the diffusion sheet. A reflective plate 122 is disposed between the light guide plate and the main support 130. The light guide plate 120 receives light emitted by the lamp(s) and directs the received light to its output surface so that the light emitted by the lamp(s) can reach the liquid crystal panel 110 through the diffusion and prism sheets 118, 117 and 116. The reflective plate 122 reflects light emitted by the lamps toward the liquid crystal panel 110 to prevent loss of light and improve efficiency. The light emitted by the lamp(s) and propagated through the backlight assembly generates images on the display panel while the liquid crystal panel 110 is operated and driven.

The main support 130 supports the backlight assembly and the liquid crystal panel 110 therein. The top case 140 fastens the liquid crystal panel 110 and the backlight assembly into the main support 130 by coupling with the main support 130. The main support 130 and the top case 140 protect the liquid crystal panel 110 from external impact. The main support 130 is generally made of a plastic material sufficiently impact resistant.

In the related art liquid crystal display device depicted in FIG. 1, the top case 140 has a rectangular shape and an internal rectangular opening. The rectangular opening exposes a display area of the underlying liquid crystal panel 110. Images are displayed on the exposed display. Also the top case 140 of the related art liquid crystal display device is molded into a single body.

The single-bodied top case 140 of the related art has some disadvantages. The top case 140 may cause shape deformation due to twisting and bending of the single-bodied shape from impact during the fabrication and/or distribution processes. Moreover, as the liquid crystal panel 110 increases in size, the size of the top case 140 also increases. Therefore, the single-bodied top case 140 may suffer from excessive deformation during use. Furthermore, the large size single-bodied top case 140 increases distribution and transportation costs.

SUMMARY OF THE INVENTION

Accordingly, the present invention is directed to a liquid crystal display module assembly that substantially obviates one or more of the problems due to limitations and disadvantages of the related art.

An object of the present invention is provide a liquid crystal display module assembly capable of resisting deformation.

Another object of the present invention is to provide a liquid crystal display module assembly having a low production cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display module includes a liquid crystal panel, a backlight assembly disposed under the liquid crystal module, a main support that supports the liquid crystal panel and the backlight assembly, and a top case divided into a plurality of top case parts at corners thereof. Each of the top case parts is coupled to the main support to fasten the liquid crystal panel and the backlight assembly.

In another aspect, the liquid crystal display module includes a liquid crystal panel, a backlight assembly disposed under the liquid crystal module, a main support that supports the liquid crystal panel and the backlight assembly, and a plurality of top case parts attached to each other to form a multi-part top case. Each of the plurality of top case parts is coupled to the main support, thereby fastening the liquid crystal panel and the backlight assembly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF ILLUSTRATED EMBODIMENTS

Reference will now be made in detail to embodiments of the present invention, which are illustrated in the accompanying drawings. While the principles of the embodiments of the present invention are generally applicable to the many types of available flat panel displays, including plasma display panels (PDP), field emission displays (FED), and the widely used liquid crystal display (LCD), it will be discussed with respect to a LCD that is used as a monitor for a portable computer.

Figure 1:
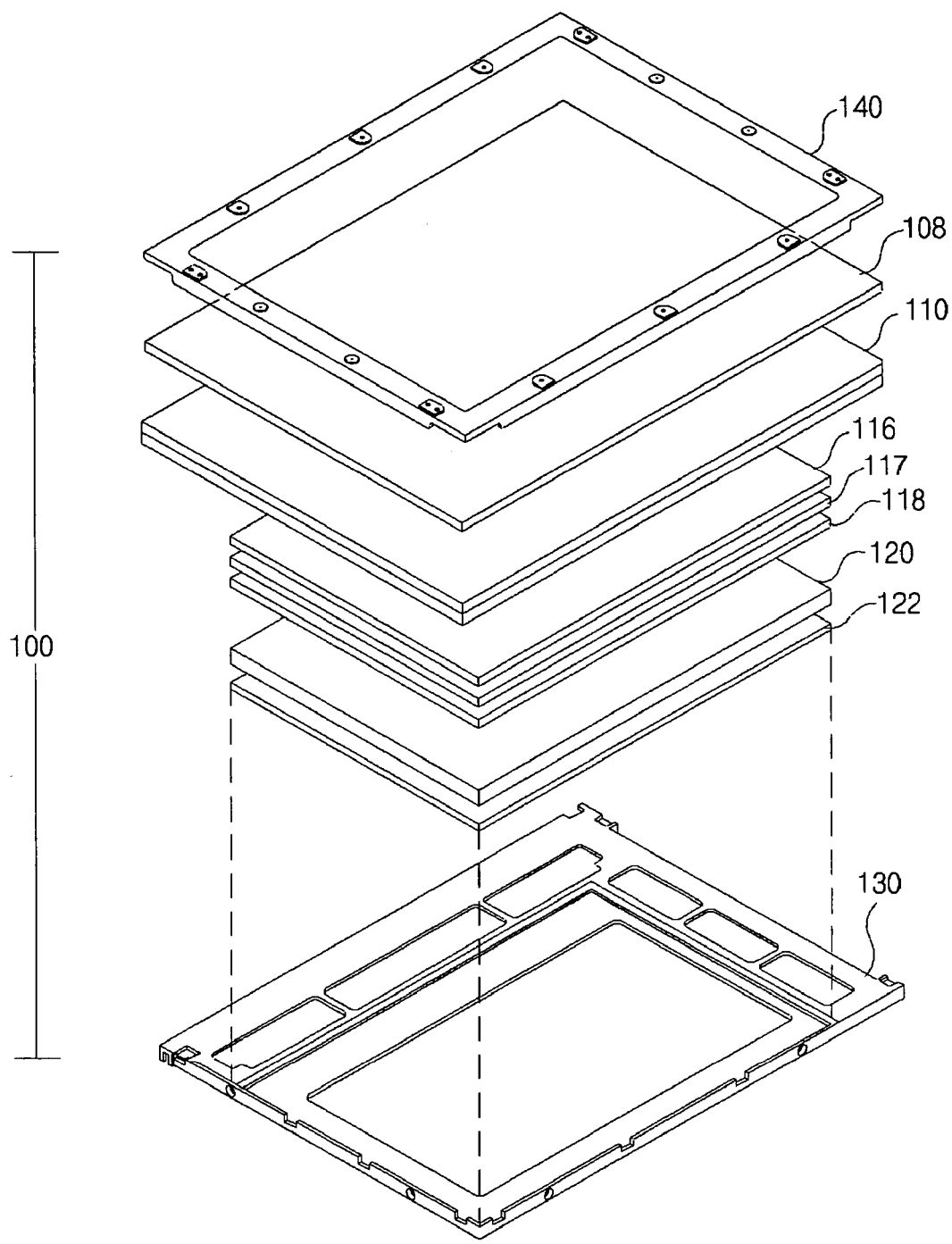
FIG. 1 is an exploded perspective view of a mounting structure of a liquid crystal display module according to related art.
Figure 2:
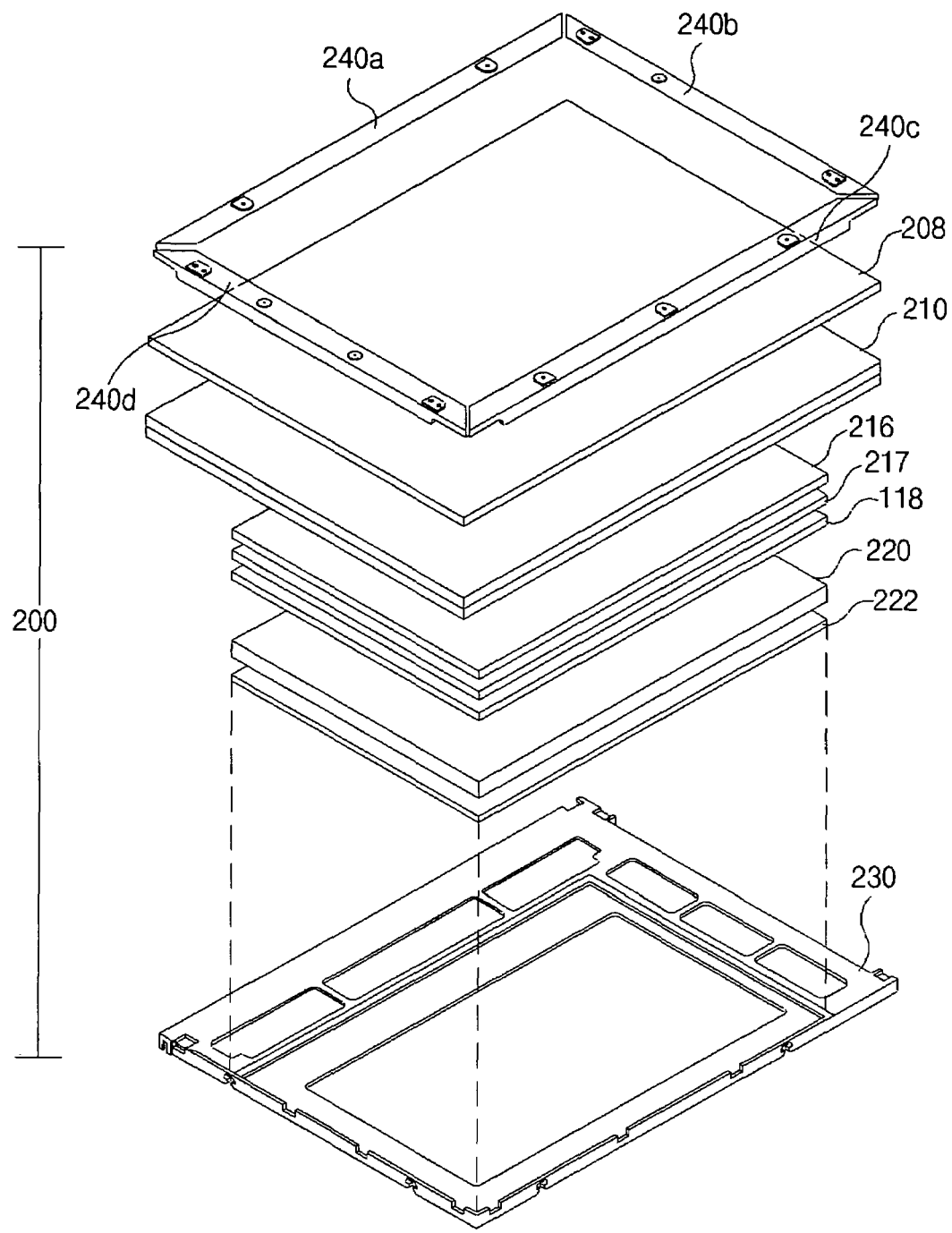
FIG. 2 is an exploded perspective view of a mounting structure of a liquid crystal display module according to embodiments of the present invention.

FIG. 2 is an exploded perspective view of a mounting structure of a liquid crystal display module according to embodiments of the present invention. In FIG. 2, the liquid crystal display module 200 includes a liquid crystal (LC) panel 210. A polarizing sheet 208 is disposed over the liquid crystal panel 210. The liquid crystal display module 200 further includes a backlight assembly, a light guide plate 220 and a reflective plate 222. The backlight assembly comprises multiple prism sheets 216 and 217, and a diffusion sheet 218. Additionally, the liquid crystal display module 210 includes main support 230 where the liquid crystal panel 210 and the backlight assembly are installed. The liquid crystal module 210 also includes a top case (240a, 240b, 240c, and 240d) that fastens the liquid crystal panel 210 into the main support 230 and protects the liquid crystal panel 210 from external impact.

Although not shown in FIG. 2, the backlight assembly further includes one or more lamps. The lamps are installed in a lamp housing (not shown). The lamp housing including the lamp(s) is generally installed in the main support 230. The lamps are connected to an inverter (not shown) and emit light toward the liquid crystal panel 210.

The light guide plate 220 disposed under the diffusion sheet 218 receives the light emitted by the lamps through a side of the light guide plate 220 facing the main support 230. Then, the light guide plate 220 directs the received light to its output surface such that the light emitted by the lamps can propagate toward the liquid crystal panel 210 through the prism and diffusion sheets 216, 217 and 218. The reflective plate 222 is disposed between the light guide plate 220 and the main support 230. The reflective plate 222 reflects incident light toward the liquid crystal panel 210 to prevent loss of light and improve light efficiency. The artificial light, which was generated by the lamp(s) and transmitted through the backlight assembly, displays images while the liquid crystal panel 210 is operated and driven.

The main support 230 supports the backlight assembly and the liquid crystal panel 210 therein. The top case (240a, 240b, 240c, and 240d) fastens the liquid crystal panel 210 and the backlight assembly to the main support 230. The main support 230 and the top case protect the liquid crystal panel 210 from external impact. The main support 230 is generally made of a plastic material that is sufficiently impact resistant.

Figure 3:
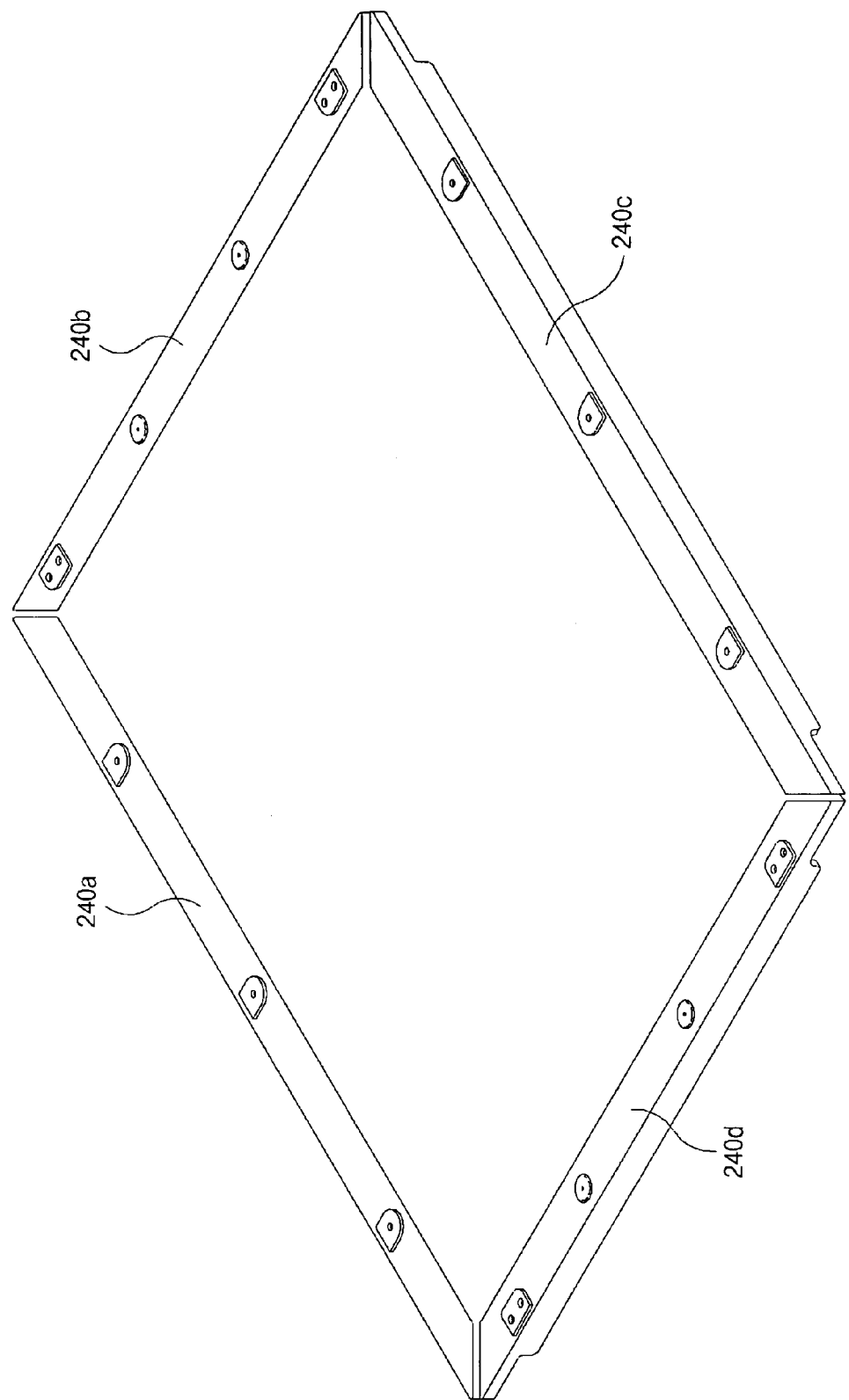
FIG. 3 is an exploded perspective view of an exemplary top case according to a first embodiment of the present invention.

FIG. 3 is an exploded perspective view of an exemplary top case according to a first embodiment of the present invention. As shown in FIGS. 2 and 3, the top case (240a, 240b, 240c, and 240d) is divided into first to fourth parts 240a–240d. Specifically, the top case is divided into four parts 240a–240d at the four corners thereof. The first to fourth parts 240a–240d are individually assembled into the liquid crystal module 200.

In accordance with this first embodiment of the present invention, the top case is divided into the first to fourth parts 240a–240d by the separations at the four corners. Each of the first to fourth parts 240a–240d covers a corresponding side of the main support 230 and gently presses the corresponding periphery of the polarizing sheet 208 so as to fasten the liquid crystal panel 110 and the backlight assembly together. The top case having the first to fourth parts 240a–240d is coupled with the main support 230 with the liquid crystal panel 210 and the backlight assembly in between. The top case parts surround the liquid crystal panel and the backlight assembly. The main support also surrounds the liquid crystal panel and the backlight assembly. Thus, the main support and the top case parts are interlocked, both surrounding the liquid crystal and the backlight assembly. The first to fourth parts 240a–240d of the top case prevent the movement of the liquid crystal panel 210 and protects both the liquid crystal panel 210 and the backlight assembly.

When the first to fourth parts 240a–240d are assembled in the liquid crystal module 200, a screw connection and/or a hook connection can be used to couple the first to fourth parts 240a–240d to the main support 230. Since the top case is divided into four parts in the present invention, each of the first to fourth parts 240a–240d can be fabricated individually. Therefore, the production costs will be reduced when forming the top case having the first to fourth parts 240a–240d. Because the top case comprises the first to fourth divided parts 240a–240d, each of the first to fourth divided parts 240a–240d is not easily twisted and bent by possible external impact. In contrast to the single-bodied top case of the related art, deformation is prevented by the division into first to fourth parts. Furthermore, although the liquid crystal panel 210 increases in size, each of the first to fourth parts 240a–240d of the top case is not much bigger than the single-bodied top case. Thus, the liquid crystal module is more portable than the related art, thereby reducing distribution and production costs.

Figure 4:
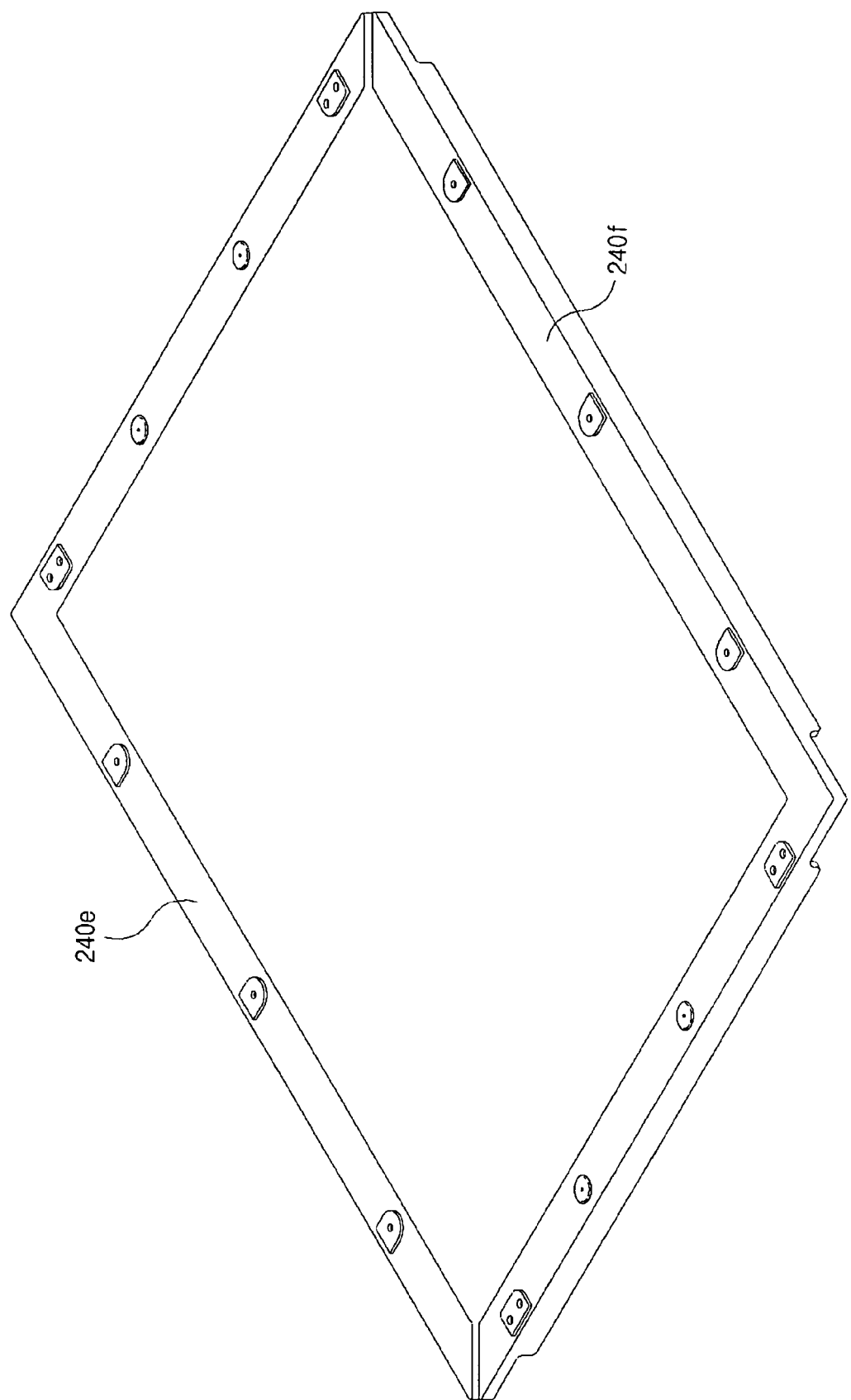
FIG. 4 is an exploded perspective view illustrating an exemplary top case according to a second embodiment of the present invention.

FIG. 4 is an exploded perspective view illustrating an exemplary top case according to a second embodiment of the present invention. In this second embodiment of the present invention, the top case is divided into two parts 240e and 240f at two diagonally opposed corners. Since the top case is separated at diagonally opposed corners, each of the top case parts 240e and 240f has an "L"-shape. Similar to the first embodiment, each of the top case parts 240e and 240f is individually coupled with the main support 230.

The exemplary embodiments of the present invention provide the following advantages. Deformation is prevented because the top case is divided into separate parts. Distribution and transportation costs will be reduced because the liquid crystal module is more portable due to the relatively small size of the individual parts.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal panel;
   a backlight assembly disposed under the liquid crystal module;

a main support that supports the liquid crystal panel and the backlight assembly; and a top case having corners and a plurality of separate top case parts at the corners thereof, wherein each of the plurality of separate top case parts is coupled to the main support to fasten the liquid crystal panel and the backlight assembly.

2. The display module according to claim 1, wherein the top case has four corners and first to fourth separate top case parts at four corners thereof.

3. The display module according to claim 2, further comprising a polarizing sheet between the liquid crystal panel and the top case.

4. The display module according to claim 2, wherein the backlight assembly is disposed between the main support and the liquid crystal panel.

5. The display module according to claim 2, wherein the backlight assembly includes:

a reflective plate;

a light guide plate disposed over the reflective plate;

a diffusion sheet disposed over the light guide plate; and a plurality of prism sheets disposed over the diffusion sheet.

6. The display module according to claim 1, wherein the top case includes first and second separate top case parts at two diagonally disposed corners thereof.

7. The display module according to claim 6, wherein each of the first and second parts has an L-shape.

8. The display module according to claim 6, further comprising a polarizing sheet between the liquid crystal panel and the top case.

9. The display module according to claim 6, wherein the backlight assembly is disposed between the main support and the liquid crystal panel.

10. The display module according to claim 6, wherein the backlight assembly includes:

a reflective plate;

a light guide plate disposed over the reflective plate;

a diffusion sheet disposed over the light guide plate; and a plurality of prism sheets disposed over the diffusion sheet.

11. The display module according to claim 1, further comprising a polarizing sheet between the liquid crystal panel and the top case.

12. The display module according to claim 1, wherein the backlight assembly is disposed between the main support and the liquid crystal panel.

13. The display module according to claim 1, wherein the backlight assembly includes:

a reflective plate;

a light guide plate disposed over the reflective plate;

a diffusion sheet disposed over the light guide plate; and a plurality of prism sheets disposed over the diffusion sheet.

14. The display module according to claim 1, wherein a screw connection is provided to individually couple each of the top case parts to the main support.

15. The display module according to claim 1, wherein a hook connection is provided to individually couple each of the top case parts to the main support.

16. The display module according to claim 1, wherein the main support surrounds the liquid crystal panel and the backlight assembly.

17. The display module according to claim 1, wherein the top case parts surround the liquid crystal panel and the backlight assembly.

18. The display module according to claim 1, wherein the main support and the top case parts surround the liquid crystal panel and the backlight assembly, and the main support and the top case parts are interlocked.

19. A liquid crystal display module, comprising:

a liquid crystal panel;

a backlight assembly disposed under the liquid crystal module;

a main support that supports the liquid crystal panel and the backlight assembly; and a plurality of top case parts attached to the main support, wherein the plurality of top case parts fasten the liquid crystal panel and the backlight assembly together.

20. The display module according to claim 19, wherein the plurality of top case parts are separate and form a top case after being respectively coupled to the main support.

* * * * *